(12) United States Patent
Nakada et al.

(10) Patent No.: US 6,987,143 B2
(45) Date of Patent: Jan. 17, 2006

(54) HYDROPHILIZING AGENT, HYDROPHILIZING FLUID, AND METHOD OF HYDROPHILIZING

(75) Inventors: Kazuya Nakada, Tokyo (JP); Motoya Kawaguchi, Tokyo (JP)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 68 days.

(21) Appl. No.: 10/181,381

(22) PCT Filed: Jan. 15, 2001

(86) PCT No.: PCT/JP01/00197

§ 371 (c)(1),
(2), (4) Date: Oct. 4, 2002

(87) PCT Pub. No.: WO01/53428

PCT Pub. Date: Jul. 26, 2001

(65) Prior Publication Data

US 2003/0065085 A1    Apr. 3, 2003

(30) Foreign Application Priority Data

Jan. 17, 2000    (JP) ............................. 2000-007978

(51) Int. Cl.
C08J 3/00    (2006.01)
C08K 3/20    (2006.01)
C08L 75/00    (2006.01)
C08F 8/30    (2006.01)
B05D 3/02    (2006.01)

(52) U.S. Cl. ................ 524/507; 427/472.2; 427/385.5; 427/388.4; 524/591; 524/839; 524/840; 525/123; 525/124

(58) Field of Classification Search ................ 524/507, 524/591, 839, 840; 525/123, 124; 427/388.4, 427/372.2, 385.5
See application file for complete search history.

(56) References Cited

FOREIGN PATENT DOCUMENTS

| JP | 1-223188 | | 9/1989 |
|----|----------|---|--------|
| JP | 6-322552 | A | 11/1994 |
| JP | 7-109355 | B2 | 11/1995 |
| JP | 8-60031 | | 3/1996 |
| JP | 8-60031 | A | 3/1996 |
| JP | 08-060031 | * | 5/1996 |
| JP | 8-291269 | | 11/1996 |
| JP | 9-003439 | | 1/1997 |
| WO | 97/00301 | | 1/1997 |

* cited by examiner

Primary Examiner—Patrick D. Niland
(74) Attorney, Agent, or Firm—Birch, Stewart, Kolasch & Birch, LLP

(57) ABSTRACT

A hydrophilizing agent comprising: (a) a hydrophilic polymer which is a copolymer of N-vinylacetamide with a polymerizable monomer having a COOX group (wherein X means hydrogen, an alkali metal atom, or an ammonium salt); (b) a water-soluble urethane resin; and (c) inorganic silica. It imparts hydrophilicity and corrosion resistance to the surface of a metallic material.

28 Claims, No Drawings

HYDROPHILIZING AGENT, HYDROPHILIZING FLUID, AND METHOD OF HYDROPHILIZING

This application is the national phase under 35 U.S.C. § 371 of PCT International Application No. PCT/JP01/00197 which has an International filing date of Jan. 15, 2001, which designated the United States of America.

TECHNICAL FIELD

The present invention relates to a novel hydrophilization agent, hydrophilization liquid, and hydrophilization method, which can impart improved hydrophilicity and corrosion resistance on the surface of metallic material, such as aluminum, aluminum-alloy, copper, copper-alloy, stainless steel and the like, particularly in a case where these materials are used for a heat exchanger.

BACKGROUND TECHNIQUE

Generally, most heat exchangers made of metallic material, such as an aluminum-containing metallic material, are so designed that their heat-dissipating and cooling portions have surface area as large as possible to enhance the heat-dissipating and cooling performance. In addition, the inter-fin space is extremely narrow to minimize the size of the heat exchanger. Therefore, when an evaporator is operated, moisture in the atmosphere condenses on the fin surface. The condensed water tends to form water drops which fill the fin gaps (clogging), when the hydrophilicity of the fin surface is poor. As a result, ventilation resistance is increased, which leads to reduction of the heat-exchanging efficiency. Such problems then arise as power loss, generation of noise, and the water drops scattering with the air stream to downstream side.

Several methods are therefore proposed and implemented for hydrophilization-treating the fin surfaces of a heat exchanger, so as to prevent water drops from filling the fin gaps and hence to improve the water wettability.

The methods for imparting hydrophilicity to the surface of metallic material are roughly classified into two types. One is an organic-inorganic composite type, in which an organic macromolecules are incorporated or added into an inorganic compound, particularly silica fine particles. The other method is an organic type mainly composed of an organic macromolecules free of silica.

For example, Japanese Examined Patent Publication (kokoku) No. 7-109355 discloses a heat exchanger, in which the former, composite organic-inorganic type is applied, and which comprises tubes and fins formed of aluminum. In this heat exchanger, a film is formed on a part or the entire surface of the aluminum and consists, at least in its surface, of a compound having a silanol group (—SiOH) and polyvinyl pyrrolidone. This film has excellent initial hydrophilicity. However, since its resistance to water solubility is poor, it is difficult to maintain the hydrophilicity for a long period of time. In addition, there remain problems unsolved with regard to foreign odor and lubricating property during the fin formation.

In addition, a hydrophilization agent for the heat exchanger disclosed in Japanese Unexamined Patent Publication (kokai) No.8-60031 contains water-dispersing silica (A), aqueous polyurethane resin (B), and an aqueous blocked polyurethane prepolymer (C). A hydrophilization method using this agent is disclosed. However, it cannot be said that the hydrophilicity persistence of the film is satisfactory.

Next, for example, Japanese Unexamined Patent Publication (kokai) No. 4-366182 is related to the latter organic type. It is disclosed that the hydrophilization surface-treating agent comprises, in terms of the solid matter, (a) 0.5~6 parts by weight of polyvinyl pyrrolidone having 50~1000 of polymerization degree, and (b) 1~10 parts by weight of polyvinyl alcohol having 80% or more of saponification degree and 100~1000 of polymerization degree, and further the agent has (a)/[(a)+(b)] in a range of 0.1~0.9. A hydrophilization surface-treating bath and a hydrophilization surface-treating method, for which the hydrophilization surface-treating agent mentioned above is used, are disclosed. However, the corrosion resistance and the resistance of the film to solubility in water, formed by this treating agent are unsatisfactory.

In addition, Japanese Unexamined Patent Publication No. 6-322552 discloses an organic type with improved hydrophilicity and corrosion resistance, suppression of and foreign odor, that is, a hydrophilization surface treating agent, which contains 5~50 parts by weight of polyacrylic acid and 5~50 parts by weight of polyethylene oxide, based on 100 parts by weight of the composition, which consists, in terms of solid matter, 5~25 parts by weight of sodium salt and/or potassium salt of carboxymethylcellulose, 25~50 parts by weight of ammonium salt of carboxymethylcellulose, and 25~70 parts by weight of N-methylolacrylamide. It is disclosed to use the hydrophilic surface-treating agent mentioned above for a hydrophilization surface-treating bath and a hydrophilization surface-treating method of aluminum material. The film formed by this method has poor hydrophilicity persistence.

As is described above, such hydrophilization agent which enables improved hydrophilicity persistence and corrosion resistance to be imparted to a heat exchanger has not been established at present.

The present invention solves the above-mentioned problems involved in the prior art. Specifically the present invention provides a hydrophilization agent, hydrophilization liquid, and hydrophilization method, which can impart improved hydrophilicity and corrosion resistance on the surface of metallic materials, the raw material of which is aluminum, aluminum alloy, copper, copper alloy, stainless steel and the like.

DISCLOSURE OF INVENTION

The present inventors exhaustively considered measures for solving the problems involved in the prior art mentioned above. As a result, it was newly found that a film having improved hydrophilicity and corrosion resistance can be formed on the surface of metallic material by using a hydrophilization agent and hydrophilization liquid, which contains a hydrophilic polymer, that is, a copolymer of N-vinylacetamide and a polymerizable monomer having a COOX group (in the formula, X means hydrogen atom, alkali metal atom or ammonium salt), water-soluble urethane resin, and inorganic silica. As a result, the present invention has been completed.

Namely, the hydrophilization agent according to the present invention is characterized in that it contains, as the essential components, (a) a hydrophilic polymer, that is, a copolymer of N-vinylacetamide and a polymerizable monomer having a COOX group (in the formula, X means hydrogen atom, alkali metal atom or ammonium salt), (b) water-soluble urethane resin, and (c) inorganic silica. In the hydrophilic polymer (a) mentioned above, the ratio of N-vinylacetamide and a polymerizable monomer having a COOX group (in the formula, X means hydrogen atom, alkali metal atom or ammonium salt) are preferably within the weight ratio of 95:5~20:80. The above-mentioned water-soluble urethane resin (b) is preferably heat-reactive, aliphatic urethane resin having a blocked isocyanate group in the molecule. In addition, the above-mentioned inorganic silica (c) is preferably water-dispersing coagulating colloidal silica having 1~200 nm of the particle diameter. Preferably, at least one additive selected from the group consisting of anti-bacteria anti-mildew agent, a surfactant, and cross-linking agent is contained. In addition, it is preferable that 10~1000 parts by weight of water-soluble urethane resin (b) and 10~1000 parts by weight of the inorganic silica (c) are blended at a weight ratio relative to 100 parts by weight of the above-mentioned hydrophilic polymer (a). Next, the hydrophilization liquid of the present invention is characterized in that it contains the above-mentioned hydrophilization agent at a concentration of 1~100 g/L. In addition, the hydrophilization method of the present invention is characterized in that the hydrophilization agent or hydrophilization liquid mentioned above is deposited on the surface of metallic material and is dried to form the hydrophilization film.

The constitutions of the present invention are described hereinafter in detail.

The hydrophilic polymer (a), which is an essential component of the hydrophilization agent or hydrophilization liquid according to the present invention, is effective to impart the persistence of hydrophilicity and to suppress the generation of foreign odor. A polymerizable monomer, which is copolymerized with the N-vinylacetamide in the hydrophilic polymer (a) is not particularly limited, provided that it is a polymerizable organic acid having a COOX group (in the formula, X means hydrogen atom, alkali metal atom or ammonium salt). As example, itaconic acid, maleic acid, maleic acid anhydride, crotonic acid, acrylic acid, (metha) acrylic acid, or their salts are listed. Among them, acrylic acid, (metha) acrylic acid and their salts are preferred. Particularly, acrylic acid and/or its alkali metal or ammonium salts are preferred from the viewpoint of the resistance to solubility in water. As such compounds, acrylic acid, sodium acrylate, potassium acrylate, ammonium acrylate are listed. One or more of these compounds can be used.

In the hydrophilic polymer (a), that is, a copolymer of N-vinylacetamide and a polymerizable monomer having a COOX group (in the formula, X means hydrogen atom, alkali metal atom or ammonium salt), the weight ratio of N-vinylacetamide and the polymerizable monomer is preferably 95:5~20:80, more preferably 90:10~30:70, further preferably 70:30~50:50. When the polymerizable monomer is less than 95:5 of weight ratio, resistance of the film formed to solubility in water is poor. On the other hand, when the polymerizable monomer is more than 20:80, the persistence of hydrophilicity is lowered.

The water-soluble urethane resin (b), which is an essential component of the hydrophilization agent and hydrophilization liquid according to the present invention, is used to fix the inorganic silica (c) in the hydrophilic film formed. That is, the water-soluble urethane resin (b) plays the role of binder in the hydrophilic film, and suppresses the scattering of the silica fine particles. As a result, improved hydrophilicity and corrosion resistance and suppression of aggressive odor and the like can be ensured for a long period of time. A hydrophilic film, which is soft, elastic and highly shrinkable, can be obtained due to the characteristic of the urethane resin. This seems to be the reason that the wear resistance, the flexing property, resistance to solubility in water, chemical resistance, low-temperature and beat resistance and durability of the film are improved. Accordingly, it is believed that, even when an anti-bacteria agent and/or an anti-mildew agent are added to the hydrophilization agent or hydrophilization liquid of the present invention, the film dissolves out only slightly. Premature solution of the anti-bacteria agent and/or the anti mildew agent is suppressed, with the result that the anti-bacteria and anti-mildew effects can be sustained in excellent manner.

As to the water-soluble urethane resin (b), its kind is not particularly limited, provided that polyisocyanate and polyol are used as the main raw materials, and the isocyanate group and hydroxyl group are brought into reaction to form a water-soluble compound having an urethane bond in the molecule. Its molecular weight is generally in a range of from ten thousand to five million, preferably from one hundred thousand to three million, more preferably from two hundred thousand to two million. In addition, the liquid state, such as colloid dispersion, emulsion and the like, as well as the ionic property, such as nonionic, anionic property, cationic property and the like are not particularly limited. As representative examples of polyisocyanate are hexamethylene diisocyanate, tetramethylene diisocyanate, tolylene diisocyanate, 4,4'-diphenylmethane diisocyanate, 1,5-naphthalene diisocyante and the like are listed. As representative examples of polyol are aliphatic polyesterpolyol, aromatic polyesterpolyol, polyetherpolyol, polycarbonatediol, polysiloxanepolyol, polybudadiene polyol, polyolefin polyol, acrylpolyol and the like are listed.

In addition, the water-soluble urethane resin (b) is preferably a heat-reactive aliphatic urethane resin having a blocked isocyanate group among various urethanes from the viewpoint of the persistence of hydrophilicity. As various blocking agent for blocking the isocyanate group, lower alcohol, phenol, aliphatic mercaptan, prussic acid, secondary aromatic amine, oxime, active methylene compound, lactum, and bisulfite and the like are listed.

The inorganic silica (c), which is an essential component of the hydrophilization agent and hydrophilization liquid of the present invention, has very high affinity to water, because the silanol group (Si—OH) present in the molecule reacts with water via the hydrogen bond. Improved hydrophilicity can be ensured by means of mixing this inorganic silica (c) in the hydrophilic film.

The inorganic silica (c) is not particularly limited to as its kind, provided that a silanol group is present in the molecule. As such inorganic silica, water-dispersing coagulating colloidal silica, pulverous fumed silica capable of dispersing in water, and alkali silicate, $SiO_2/M_2O$ (in the equation, M designates the alkali metal, such as lithium, sodium, potassium and the like) usually referred to as the water glass are listed. The water-dispersing coagulating colloidal silica is preferably used among them, from the viewpoint of liquid-stability and hydrophilicity. In addition, its particle diameter is preferably in a range of from 1 to 200 nm, more preferably in a range of from 5 to 100 nm. When its diameter is less than 1 nm, the hydrophilicity of the hydrophilic film formed is poor. On the other hand, when its particle diameter is more than 200 nm, the strength of film is low so that adhesion with the metallic material is lowered.

An anti-bacteria agent and/or anti-mildew agent may be added into the hydrophilization agent and hydrophilization liquid of the present invention so as to suppress the putrefaction odor due to propagation of bacteria, mildew and yeast, provided that the effects of the present invention are not impeded. Desirably, the anti-bacteria/mildew agent usable in the present invention is such that can resist, during the drying step after depositing the hydrophilization agent or hydrophilization liquid, the heating for removal of water, which is a solvent of the treatment agent or treatment liquid. That is, the decomposition temperature of the anti-bacteria/mildew agent is preferably approximately 100° C. or more.

Such anti-bacteria and/or anti-mildew agent is selected, for example, from 5-chloro-2-methyl-4-isothiazoline-3-on, 2-methyl-4-isothiazoline-3-on, 2-( 4-thiocyano-methylthio) benzothizole, 2,2-dibromo-3-nitrilopropyon amide, sodium-ethylene bis (dithiocarbamate), sodium-2-pyridionethiol-1-oxide, zinc-2-pyridinethiol-1-oxide, 2,2'-dithiobis-(pyridine-1-oxide), 2,4,5,6-tetrachloro isophthalonitorile, 2-methylcarbonyl aminobenzilimidazaole, 2,3,5,6-tetrachloro-4-(methylsulfonyl)-pyridine, 2-(4-thyazolyl)-benzimidazole, N-(fluorodichloromethyl thio) sulfamide, p-chloro-m-xylenol, dehydroacetic acid, 0-phenylphenol, 1,2-benzisothiazoline-3-on, 1,2-benzisothyazoline barium, diiodemethyl-p-toluenesulfone, 2-n-octyl-4-isothyazaoline-3-on, 10,10'-oxybisphenoxyarsine, 1,2-dibromo-2,4-dicyanobutane, 2-bromo-2-nitropropane-diol, p-oxypropyl benzonatepropyl, 3-iode-2-propylbutylcarbamate, 1,3-dimethylol-5,5'-dimethylhydratoin, 1 or 3-monodimethylol-5,5'-dimethylhidantoin, and various inorganic anti-bacteria agents, such as Ag-based agents.

The addition amount of the anti-bacteria and/or anti-mildew agent is preferably 0.1~30 parts by weight, more preferably from 1~20 parts by weight, relative to 100 parts by weight of the total weight of the components (a), (b) and (c). When the addition amount is less than 0.1 parts by weight, the film formed does not satisfactorily exhibit anti-bacteria and anti-mildew resistance. On the other hand, when the addition amount exceeds 30 parts by weight, its effects saturate and the cost of the treating agent and the treating liquid uneconomically increases and hence the agent becomes impracticable.

If necessary to further improve the lubricating property of the film formed by using the hydrophilization agent or the hydrophilization liquid of the present invention, or to improve the depositing wettablity of the agent or the liquid on the surface of the metallic material, a surfactant may be added, if necessary. The surfactant used for this purpose is not limited and may be any one of the anionic, cationic, nonionic or amphoteric surfactants. However, it is preferable not to use a surfactant having an ionic property opposite to that of the components (a), (b) and (c) used in a combination with the surfactant, since the stability of the treating liquid may be adversely affected.

The following are examples of surfactants capable of adding into the hydrophilization agent or hydrophilization liquid of the present invention: non-ionic surfactant, such as polyoxyethylene alkylether, e.g. polyoxyethylene laurylether and polyoxyethylene stearylether, polyoxyethylene alkylphenylether, e.g., polyoxyethylene nonyl-phenlylether, sorbitan fatty acid ester, e.g., a block polymer of oxyethylene and oxypropylene (Pluronic), sorbitan monolaurate and sorbitan monostearate, fatty acid ester of polyoxyethylen, e.g., polyoxyethylene laurate, polyoxyethylene stearate, and polyoxy-ethylene oleate, glycerin fatty acid ester, and polyoxyethylene propylene glycol alkyl phenol ether; anionic surfactant such as fatty acid salt, e.g., sodium laurate, sodium stearate and sodium olealate, alkyl sulfate, e.g., sodium dodecylsulfate, alkylsulfosuccinate, dialkylsulfosuccinate, alkenylsulfosuccinate and polyoxyethylene alkyl sulfate; cationic surfactant, such as alkylamine salt, e.g., stearylaminde acetate, quaternary ammonium salt, e.g., stearylamine acetate, quaternary ammonium salt, e.g., strearyltrimethyl ammonium alkylbetaine, e.g., lauryl betaine, and amineoxide; and, amphoteric surfactant such as aminoproyonate and; alkyl dimethyl betaine. In addition, fluorine-based amphoteric surfactant and silicon-based surfactant are used.

The addition amount of the above-mentioned surfactant is preferably in a range of 0.05~20 parts by weight, more preferably 0.1~10 parts by weight relative to 100 parts by weight of the total weight of the components (a), (b) and (c). When the addition amount is less than 0.05 parts by weight, the hydrophilization film does not exhibit satisfactory lubrication property. On the other hand, when the addition amount exceeds 20 parts by weight, there arises disadvantageously a danger that the adhesiveness of the film on the metallic material is lowered.

In the present invention, a cross-linking agent can be used to further enhance the resistance of the hydrophilic film to solubility in water. The cross-linking agent, which is contained in the hydrophilization agent and hydrophilization liquid of the present invention, is preferably a water-soluble organic cross-linking agent, for example, polymethylol, polyglycidine, polyaziridile compound and aldehydes. Namely, it can be selected from polymethylol melamine, methylol urea, methylolized polyacrylamide, polyethylene glycol, diglycidylether, diaziridilated polyethylene oxide, glyoxal, furfural and the like.

The addition amount of the cross-linking agent mentioned above is preferably in a range of from 0.1~50 parts by weight relative to 100 parts by weight of the total weight of the components (a), (b) and (c) used in combination. When this addition amount is less than 0.1 parts by weight, the cross-linking effect is poor. On the other hand, when the addition amount exceeds 50 parts by weight, the hydrophilization film becomes so hard as to embrittle. Furthermore, there is a danger that the formability and adhesiveness with the metallic material are disadvantageously lowered.

In the hydrophilization agent of the present invention, it is preferable to blend the water-soluble urethane resin (b) and inorganic silica (c) mentioned above with the hydrophilic polymer (a) mentioned above at a weight ratio 10~1000 parts by weight of (b) and 10~1000 parts by weight of (c) relative to 100 parts by weight of (a). More preferably, 20~500 parts by weight of water-soluble urethane resin (b) and 50~700 parts by weight of inorganic silica (c) relative to 100 parts by weight of the hydrophilic polymer (a). When the blending weight ratio of the water-soluble urethane resin (b) is less than 10 parts by weight, the resistance of the formed film to solubility in water is unsatisfactory. On the other hand, when the blending weight ratio exceeds 1000 parts by weight, the hydrophilicity of the film is disadvantageously lowered. In addition, when the blending weight ratio of the inorganic silica (c) is less than 10 parts by weight, the hydrophilicity of the film formed is unsatisfactory. On the other hand, when the blending weight ratio exceeds 1000 parts by weight, there is a danger that a problem of aggressive odor arises and flexibility of the film is lowered.

In the hydrophilization treating liquid of the present invention, the hydrophilization agent mentioned above is contained preferably at a concentration of 1~100 g/L, more preferably at a concentration range of 5~50 g/L. When the concentration is less than 1 g/L, it is difficult to ensure such film thickness as to demonstrate such functions as the hydrophilicity and corrosion resistance. On the other hand, when the concentration exceeds 100 g/L, its effects saturate and the agent becomes economically impracticable.

The solvent of the hydrophilization agent and hydrophilization liquid of the present invention is mainly composed of water. There is no problem at all to additionally use a water-soluble solvent such as various alcohols, ethers, ketones and glycols so as to adjust and improve the drying speed. In addition, one or more of rust-proof agent, leveling agent, filler, colorant, antifoamer may be into the hydrophilization agent or hydrophilization liquid of the present invention, in a range where neither the gist of the present invention nor the film properties are impaired.

The hydrophilization agent and the hydrophilization liquid of the present invention is used as is, or as the surface-treatment liquid, in which the agent is diluted with water. The concentration and the viscosity of the treatment liquid are adjusted appropriately to meet the application method on the surface of the metallic material, the targeted thickness of the film and the like.

A method for depositing the hydrophilization agent or hydrophilization liquid on the surface of metallic material is not particularly limited, and may be any one of the application methods with a roll coater, brush and the like, dipping method, flow-coat method, injection method, and spraying method. The contact time at the deposition on the surface of metallic material is not particularly limited.

The drying method after depositing the hydrophilization agent and hydrophilization liquid of the present invention is not particularly limited. Usually, it is preferable to use a hot-blast oven and the like and to dry in a temperature range of 50~300° C., more preferably 100~250° C. When the drying temperature is less than 50° C., the film formation does not advance satisfactorily, so that corrosion resistance and resistance of the film to solubility in water are poor. On the other hand, when the drying temperature exceeds 300° C., there is a danger that a problem of foreign odor arises.

Preferably, the post-drying thickness of the hydrophilic film formed by using the hydrophilization agent and hydrophilization liquid of the present invention is within a range of 0.05~5 $\mu$m, more preferably from 0.1~2 $\mu$m. When the film thickness is less than 0.05 $\mu$m, it is difficult to impart satisfactory hydrophilicity. On the other hand, when the film thickness exceeds 5 $\mu$m, there is a possibility that the heat conductivity is disadvantageously lowered.

In a preferable hydrophilization method of the present invention, the surface of the metallic material is degreased and washed, or pre-treated by chemical conversion and the like for the purpose of enhancing the corrosion resistance and the like. Subsequently, the hydrophilization agent and the hydrophilization liquid are deposited on the surface of the metallic material and are heated and dried so as to form a hydrophilic film. As the chemical conversion treatment for enhancing the corrosion resistance, anodic oxidation treatment, boemite treatment, chromic chromate treatment, and various non-chromate treatments (zirconium-based, titanium-based, vanadium-based, cerium-based, zinc phosphate-based, silane-coupling based, resin-based and the like) are listed.

BEST MODE FOR CARRYING OUT INVENTION

Examples as well as Comparative Examples are shown hereinbelow. The effects of the hydrophilization agent and liquid and the hydrophilization method of the present invention are more specifically described. However, the scope of the present invention is not limited by these examples.

[Test Samples]

An aluminum-alloy sheet (JIS-3004, dimension 70 mm×150 mm, sheet thickness—0.12 mm) was used.

[Treatment Condition]

A hydrophilization-treated sheet was manufactured by means of the treatments in the sequence of the following process [1]→[2]→[3]→[4]→[5]→[6]→[7]→[8]

[1] Degreasing (65° C., 2 minutes, dipping method)
Aqueous solution of a commercially available, alkaline detergent agent (registered trademark, Fine Cleaner 315, product of Nihon Parkerizing Co., Ltd. 3% solution)

[2] Water Washing (normal temperature, 30 seconds, spraying method)

[3] Chemical Conversion Treatment (40° C., 1 minute, dipping method)
Aqueous solution of a commercially available, chromate phosphate chemical conversion treatment agent (mixed solution of 4% of registered trademark, Alchrome K702SL and 0.3% of registered trademark Alchrome K702AC, both products of Nihon Parkerizing Co., Ltd.) was used to form a chromate phosphate film (Cr depositing amount—50~60 mg/m$^2$) on the aluminum-alloy sheet.

[4] Water Washing (normal temperature, 30 seconds, spraying method)

[5] Washing with Deionized Water (normal temperature, 30 seconds, spraying method)

[6] Hydro-extracting Drying (50° C., 3 minutes, drying in a hot-blast oven)

[7] Hydrophilization Treatment
The total content of the non-volatile matter of the hydrophilization liquid was adjusted to 3%. The so-adjusted hydrophilization liquid was applied on the sheet, which was treated by the chromate phosphate mentioned above, by means of a bar coater No. 10 (thickness of the hydrophilization film after heating and drying is 0.4 to 0.5 $\mu$m). The hydrophilization agent was prepared by using the components and additives mentioned above. The composition of the hydrophilization liquid is shown in Table 1. Examples 1–10 are shown in Table 2. Comparative Examples 1–7 are shown in Table 3.

[8] Heating and Drying (150° C., 10 minutes, a hot-blast drier)

(a) Hydrophilic Polymer
① Copolymer of NVA/sodium acrylate=30/70 (weight ratio)

② Copolymer of NVA/acrylic acid=60/40 (weight ratio)
③ Copolymer of NVA/potassium acrylate=90/10 (weight ratio)
④ Polymer of NVA alone
⑤ Polyacrylic acid
Remarks: NVA—N-vinylacetamide
(b) Water-soluble urethane resin
① polyether-based aliphatic urethane resin (nonionic, containing a blocked isocyanate group)
② polyether-based aromatic urethane resin (anionic, containing a blocked isocyanate group)
③ polyester-based aliphatic urethane resin (anionic, containing a blocked isocyanate group)
④ polyester-based aliphatic urethane resin (anionic, without a blocked isocyanate group)
(c) Inorganic Silica
① Water dispersing coagulating colloidal silica (particle diameter: 40~100 nm)
② Pulverous fumed silica (gas-phase silica, particle diameter: 0.3 μm)
③ Potassium silicate (water glass, $SiO_2/K_2O=3/1$ (mole ratio))
(d) Additive
(Anti Bacteria Agent)
① Zinc-2-pyridinethiol-1-oxide
(Surfactant)
② Anionic surfactant (Product of Sanyo Kasei Kogyo Co., Ltd. Eleminol JS-2: alkylallylsulfo sodiumsuccinate)
(Cross-Linking Agent)
③ Glyoxal In Comparative Example 1, the hydrophilic polymer is not a copolymer. The hydrophilic film is formed by a polymer of N-vinylacetamide alone.

In Comparative Example 2, the hydrophilic film is formed by a hydrophilic polymer, which does not contain at all a copolymer polymerized by using N-vinylacetamide.

In Comparative Example 3, the hydrophilic film formed does not contain water-soltuble urethane.

In Comparative Example 4, the hydrophilic film formed does not contain inorganic silica.

Comparative Example 5 is Example 9 of Japanese Examined Patent Publication (kokoku) No. 7-109355.

Comparative Example 6 is Example 3 of Japanese Unexamined Patent Publication (kokai) No. 8-60031

Comparative Example 7 is Example 1 of Japanese Unexamined Patent Publication No. 4-366182

[Evaluation Method]
(1) Hydrophilicity Persistence

The hydrophilization treated sheets mentioned above were immersed in de-ionized water at room temperature for 72 hours. Drying was carried out at 80° C. for 5 minutes. The contact angle of water on the hydrophilization-treated sheet was measured by FACE contact angle tester (type: CA-P, Product of Kyowa Kaimen Kagaku Co., Ltd.)

The evaluation criterion of the hydrophilicity persistence is as follows.
(Water Contact Angle)
◎: less than 10°
○: 10° or more, less than 20°
Δ: 20° or more, less than 30°
×: 30° or more
(2) Resistance to Solubility in Water The hydrophilization treated sheets mentioned above were immersed in de-ionized water at room temperature for 72 hours. Drying was carried out at 80° C. for 5 minutes. The weight difference of the hydrophilic film prior and subsequent to immersion was obtained. The dissolving ratio in water was then obtained by the following formula.

Solution Ratio in Water (%)={(initial weight of film−weight of film after immersion/initial weight of film)×100

The evaluation criterion of resistance of solubility to water is as follows.
(Ratio of Solution in Water)
◎: less than 10%
○: 10% or more, less than 30%
Δ: 30% or more, less than 50%
×: 50% or more
(3) Corrosion Resistance The salt-spray test based on JIS-Z-2371 was carried out. After spraying for 240 hours, the state of corrosion generation on the samples was evaluated by the naked eye. The evaluation criterion of the corrosion resistance is as follows.
(Area Ratio of Corrosion)
◎: less than 10%
○: 10% or more, less than 30%
Δ: 30% or more, less than 50%
×: 50% or more
(4) Prevention of Aggressive Odor The hydrophilization treated sheets mentioned above were immersed in de-ionized water at room temperature for 72 hours, followed by drying at 80° C. for 1 hour and then exposure to the water vapor of boiled de-ionized water for approximately 1 second. The aggressive odor was quickly smelled and evaluated. Evaluation criterion of the prevention of foreign odor is as follows.
(Sensual Foreign Odor)
◎: no appreciable foreign odor at all
○: somewhat appreciable foreign odor
Δ: evidently appreciable foreign odor
×: very strong appreciable foreign odor The evaluation results are shown in Table 1 and Table 2.

As is apparent from the evaluation results of Table 1 and Table 2, the hydrophilic film of Examples 1 through 10, which was formed by using the hydrophilization agent, the hydrophilization liquid and the hydrophilization method of the present invention, exhibits improved hydrophilicity persistence, resistance to solubility in water, corrosion resistance, and prevention of aggressive odor generation. Contrary to this, in the hydrophilic film of Comparative Examples 1 through 7, several properties are unsatisfactory and do not attain the level to fulfill the practically requested functions.

INDUSTRIAL APPLICABILITY

As is apparent from the descriptions hereinabove, it became possible that a hydrophilic film having hydrophilicity persistence, resistance to solubility in water, corrosion resistance, and prevention of aggressive odor generation is formed by means of applying the hydrophilization agent, the hydrophilization liquid and the hydrophilization method according to the present invention to the metallic material.

Consequently, the hydrophilization agent, the hydrophilization liquid and the hydrophilization method according to the present invention are extremely useful in practice.

TABLE 1

Composition, Condition and Evaluation Results in Examples 1~10

| | Composition of Hydrophilic Treating Liquid (Components and Blending Weight Parts) | | | | | | | | Evaluation Result | | | |
|---|---|---|---|---|---|---|---|---|---|---|---|---|
| | (a) Hydrophilic polymer | | (b) Urethane resin | | (c) Inorganic Silica | | (d) Additive | | Hydrophilicity Persistence | Resistance to Solubility in water | Corrosion Resistance | Prevention of Foreign Odor Generation |
| Example 1 | ① | 100 | ② | 20 | ① | 100 | ① ② ③ | 10 3 15 | ◎ | ○ | ◎ | ◎ |
| Example 2 | ② | 100 | ③ | 600 | ① | 900 | — | — | ◎ | ◎ | ◎ | ○ |
| Example 3 | ③ | 100 | ③ | 400 | ① | 500 | ① ② | 50 5 | ◎ | ○ | ◎ | ○ |
| Example 4 | ① ③ | 50 50 | ④ | 50 | ① | ⑧ | ② ③ | 3 10 | ○ | ○ | ○ | ◎ |
| Example 5 | ② | 100 | ① | 200 | ① | 400 | ② | 5 | ◎ | ◎ | ◎ | ○ |
| Example 6 | ② | 100 | ③ | 200 | ③ | 200 | ② | 2 | ◎ | ○ | ◎ | ○ |
| Example 7 | ② | 100 | ③ | 150 | ① | 50 | ② ③ | 3 30 | ○ | ○ | ◎ | ◎ |
| Example 8 | ② | 100 | ① | 50 | ② | 20 | ② ③ | 3 50 | ○ | ○ | ○ | ◎ |
| Example 9 | ② ③ | 80 20 | ③ | 300 | ① ③ | 250 250 | ① ③ | 50 50 | ◎ | ◎ | ◎ | ○ |
| Example 10 | ① | 100 | ① ③ | 150 150 | ① ② | 450 10 | ② | 5 | ◎ | ○ | ◎ | ○ |

TABLE 2

Composition, Condition and Evaluation Results in Comparative Examples 1~7

| | Composition of Hydrophilic Treating Liquid (Components and Blending Weight Parts) | | | | | | | | Evaluation Result | | | |
|---|---|---|---|---|---|---|---|---|---|---|---|---|
| | (a) Hydrophilic polymer | | (b) Urethane resin | | (c) Inorganic Silica | | (d) Additive | | Hydrophilicity Persistence | Resistance to Solubility in water | Corrosion Resistance | Prevention of Foreign Odor Generation |
| Comparative Example 1 | ④ | 100 | ③ | 150 | ① | 50 | ② ③ | 3 30 | △ | △ | ◎ | ◎ |
| Comparative Example 2 | ⑤ | 100 | ③ | 200 | ③ | 200 | ② | 2 | △ | ○ | △ | △ |
| Comparative Example 3 | ② | 100 | — | — | ① | 300 | ② | 2 | ○ | △ | ○ | X |
| Comparative Example 4 | ② | 100 | ③ | 200 | — | — | ② | 2 | X | △ | ○ | ◎ |
| Comparative Example 5 | Example 9 of Japanese Examined Patent Publication No.7-109355 | | | | | | | | ○ | △ | ○ | △ |
| Comparative Example 6 | Example 3 of Japanese Unexamined Patent Publication No. 8-60031 | | | | | | | | △ | ◎ | ◎ | ○ |
| Comparative Example 7 | Example 1 of Japanese Unexamined Patent Publication 4-366182 | | | | | | | | X | △ | ○ | ○ |

The invention claimed is:

1. A hydrophilization agent comprising:
   (a) a copolymer of N-vinylacetamide and a polymerizable monomer having a COOX group (in the formula, X means a hydrogen atom, alkali metal atom or ammonium salt),
   (b) a water-soluble urethane resin, and
   (c) inorganic silica.

2. The hydrophilization agent according to claim 1, wherein the ratio of N-vinylacetamide and the polymerizable monomer having the COOX group is within a weight ratio of 95:5~20:80.

3. The hydrophilization agent according to claim 1, wherein said water-soluble urethane resin (b) is a heat-reactive aliphatic urethane resin including a blocked isocyanate group in the molecule.

4. The hydrophilization agent according to claim 1, wherein (c) said inorganic silica is water-dispersing coagulating colloidal silica having from 1~200 nm of particle diameter.

5. The hydrophilization agent according to claim 1 wherein said hydrophilization agent further contains at least one additive selected from the group consisting of an anti-bacteria/mildew agent, a surfactant and a cross-linking agent.

6. The hydrophilization agent according to claim 1 wherein 10~1000 parts by weight of (b) the water-soluble urethane resin and (c) 10~1000 parts by weight of (c) the inorganic silica are blended relative to 100 parts by weight of (a) said copolymer.

7. The hydrophilization agent according to claim 6, wherein said hydrophilization agent further contains at least one additive selected from the group consisting of anti-bacteria/mildew agent, a surfactant and a cross-linking agent.

8. A hydrophilization liquid comprising 1~100 g/L of a hydrophilization agent, said hydrophilization agent comprising
(a) a copolymer of N-vinylacetamide and a polymerizable monomer having a COaX group (in the formula, X means a hydrogen atom, alkali metal atom or ammonium salt),
(b) water-soluble urethane resin, and
(c) inorganic silica.

9. The hydrophilization liquid according to claim 8, wherein the ratio of the N-vinylacetamide and the polymerizable monomer having the COOX group is within a weight ratio of 95:5~20:80.

10. The hydrophilization agent according to claim 8, wherein said water-soluble urethane resin (b) is a heat-reactive aliphatic urethane resin including a blocked isocyanate group in the molecule.

11. The hydrophilization liquid according to claim 8, wherein (c) said inorganic silica is water-dispersing coagulating colloidal silica having from 1~200 nm of particle diameter.

12. The hydrophilization liquid according to claim 8, wherein the hydrophilization agent contains at least one additive selected from the group consisting of an anti-bacteria/mildew agent, a surfactant and a cross linking agent.

13. The hydrophilization liquid according to claim 8, wherein 10~1000 parts by weight of (b) the water-soluble urethane and 10~1000 parts by weight of (c) the organic silica are blended relative to 100 parts by weight of (a) said copolymer.

14. The hydrophilization liquid according to claim 13, wherein the hydrophilization agent further contains at least one additive selected from the group consisting of an anti-bacteria/mildew agent, a surfactant and a cross linking agent.

15. A hydrophilization method wherein a hydrophilization agent comprising
(a) a copolymer of N-vinylacetamide and a polymerizable monomer having a COOX group (in the formula, X means a hydrogen atom, alkali metal atom or ammonium salt),
(b) water-soluble urethane resin, and
(c) inorganic silica,
is deposited on the surface of metallic material and dried to form a hydrophilic film.

16. The hydrophilization method according to claim 15, wherein the ratio of N-vinylacetamide and a polymerizable monomer is within a weight ratio of 95:5~20:80.

17. The hydrophilization method according to claim 15, wherein said water-soluble urethane resin (b) is a heat-reactive aliphatic urethane resin including a blocked isocyanate group in the molecule.

18. The hydrophilization method according to claim 15, wherein (c) said inorganic silica is water-dispersing coagulating colloidal silica having from 1~200 nm of particle diameter.

19. The hydrophilization method according to claim 15, wherein the hydrophilization agent further contains at least one additive selected from the group consisting of an anti-bacteria and an anti-mildew agent, a surfactant and a cross-linking agent.

20. The hydrophilization method according to claim 15, wherein 10~1000 parts by weight of (b) the water-soluble urethane resin and 10~1000 parts by weight of (c) the inorganic silica are blended relative to 100 parts by weight of (a) said copolymer.

21. The hydrophilization method according to claim 20, wherein the hydrophilization agent further contains at least one additive selected from the group consisting of an anti-bacteria/mildew agent, a surfactant and a cross-linking agent.

22. A hydrophilization method wherein a hydrophilization liquid, which comprises 1~100 g/L of a hydrophilization agent containing (a) a copolymer of N-vinylacetamide and a polymerizable monomer having a COOX group (in the formula, X means a hydrogen atom, alkali metal atom or ammonium salt), (b) water-soluble urethane resin, and (c) inorganic silica,
is deposited on the surface of metallic material and dried to form a hydrophilic film.

23. The hydrophilization method according to claim 22, wherein the ratio of the N-vinylacetamide and the polymerizable monomer is within a weight ratio of 95:5~20:80.

24. The hydrophilization method according to claim 22, wherein said water-soluble urethane resin (b) is a heat-reactive aliphatic urethane resin including a blocked isocyanate group in the molecule.

25. The hydrophilization method according to claim 22, wherein (c) said inorganic silica is water-dispersing coagulating colloidal silica having from 1~200 nm of particle diameter.

26. The hydrophilization method according to claim 22, wherein the hydrophilization agent further contains at least one additive selected from the group consisting of an anti-bacteria/mildew agent, a surfactant and a cross linking agent.

27. The hydrophilization method according to claim 22, wherein 10~1000 parts by weight of (b) the water-soluble urethane and 10~1000 parts by weight of (c) the inorganic silica are blended relative to 100 parts by weight of (a) said copolymer.

28. The hydrophilization method according to claim 27, wherein the hydrophilization agent further contains at least one additive selected from the group consisting of anti-bacteria/mildew agent, a surfactant and a cross linking agent.

* * * * *